Figure 1:
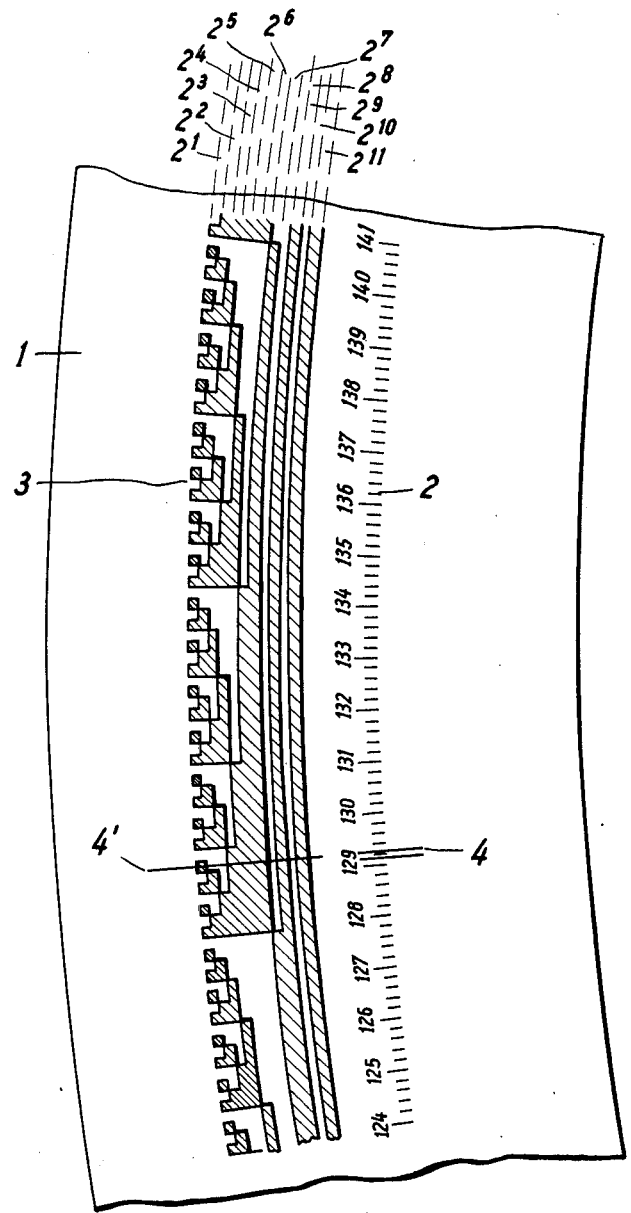

Inventors:
EDUARD LANG
WALTER FAULIAN
ERWIN ZWICKERT
ATTONEYS

Aug. 17, 1965        E. LANG ETAL         3,200,696
             THEODOLITE WITH CODED INDICATIONS
Filed Dec. 20, 1960                      3 Sheets-Sheet 3

Inventors
EDUARD LANG
WALTER FAULIAN
ERWIN ZWICKERT

ATTORNEYS
McGlew and Toren

United States Patent Office 3,200,696
Patented Aug. 17, 1965

3,200,696
THEODOLITE WITH CODED INDICATIONS
Eduard Lang, Wiesbaden, Walter Faulian, Sandershausen, near Kassel, and Erwin Zwickert, Kassel, Germany, assignors to Otto Fennel Söhne K.G., Kassel, Germany, a German firm
Filed Dec. 20, 1960, Ser. No. 77,208
Claims priority, application Germany, Jan. 18, 1960,
F 30,328
5 Claims. (Cl. 88—1)

This invention relates in general to theodolite constructions and, in particular, to a new and useful theodolite having circle readings up to one second of arc and including coded indications of both the circle and an optical micrometer scale which are optically combined for recording purposes.

The present invention has particular application in respect to very precise theodolite instruments and to a theodolite construction which includes coded symbols arranged adjacent the arcuate divisions, or in place thereof. The instrument includes an optical micrometer by which the smallest circle graduation interval, for example, ten minutes of arc or 600 seconds of arc is indicated by sub divisions or intervals which are demarcated thereon.

In modern optical reading theodolites two principles are prevailing for reading the divisions of a circular arc: Coincidence setting of the images of the diametrically opposite circle position, or bisection of light gaps between couples of double lines, which originate from diametrically opposite circle positions, by a suitable index line. The means for providing the coincidence of the bisection by the index line is known as an optical micrometer in which parallel plates, glass wedges, prisms or other known optical elements are suitably combined with the above mentioned scales for subdividing the smallest indicated interval of the circle graduation.

The reading of such theodolites is taken by adding the indication of the optical micrometer scale to the value of the set couple of the circle graduation lines. In such instruments it is evident that errors due to faulty readings such as confusing numbers (for example, confusing 265 with 256) due to such errors as faulty recording, faulty transfer to the computation forms, etc., are unavoidable. Furthermore, the process is not economical.

Improvements have been achieved by recording the indication of the theodolite photographically for the evaluation of the film by means of microscope. Nevertheless, errors even in the course of computation still occur. For the preparation of the measuring dates for the input into electronic computers errors due to mistakes in transcribing records or mistakes in perforating indicating cards or tapes must be anticipated. With all of the prior art devices human errors in measurements, transcribing and reading are ever present.

In accordance with the present invention, there is provided an optical reading theodolite wherein the indications of the instrument such as graduated circular scale readings, micrometer readings and coded numbers, are simultaneously recorded by an instrument such as a photographic camera. The arrangement is such that the information is transmitted to the camera or a suitable electronic device in place of the camera without any influence on the readings of both the circles and the optical micrometer scale or the coded information.

The coded information advantageously includes, beside the circle readings, suitable information in respect to the numbers of points, targets, etc. This information is simultaneously arranged with the circle and micrometer indications in the instrument. Additional information, such as linear eccentricities, tape measured distances, or the like, must be capable of being recorded. For this purpose, the present invention includes an input mechanism in which numerical values can be set, the corresponding code symbols of such values being recorded on the same recording means on which the code symbols and micrometer scale are registered.

In the computing department the film which is employed for recording purposes is electronically evaluated and the coded symbols are transferred by perforating cards or tapes or by giving impulses on magnetic tape or other suitable input means for electronic computers.

In accordance with another aspect of the invention, an electronic pick-up element or means can be used instead of the photographic camera. This electronic means thereby provides direct punching of cards or tapes or impulsing other suitable material for the input into computers either by tape to a corresponding writer or perforator, or even by wireless to the center of the computation department. It is provided furthermore that both the photographic camera and the electronic pickup head be interchangeable according to the demands of the actual survey. The interchangeability of the recording device permits manifold possibilities of operation. For frequent change of position, such as in the course of traversing, it is expedient to use photographic recording whilst for a mainly stationary setting as is characteristic for triangulations, the electronic pick-up for direct perforation is preferred.

According to the present invention, the rigorous bisection of the light gaps with the aid of an optical micrometer can be achieved either by hand or preferably by an electronic element that is known as an electronic eye. The essential idea of the present invention is that the graduation is used for setting the bisection in a usual manner. Coded material is included adjacent the circle indications and only serves as a numbering, thus not requiring the accuracy of the one second of arc which is necessary for the circle graduation lines. This combination of highly precise graduation with a less accurate code in addition to, or instead of the usual ciphers of a graduated circle, together with the indication of the optical micrometer scale provides the recording of circle readings up to one second of arc.

In accordance with the invention, in order to produce well defined recorded indications of the circle code, it is necessary that the light rays forming the image of the code pass through the optical parts of the optical micrometer. Consequently, the code is defined in alignment with and follows exactly the shifting of the image of the circle graduation so that the image of the code is precisely transferred optically into the mask in a common image plane from which the record is taken, such as by a camera or electronic pick-up located to focus on such a plane.

The scale of the optical micrometer must be coded with the usual accuracy of optical micrometer graduations since in this case the code represents the graduation itself in its position relative to a given index or mark. The addition of the recorded code indications of the circle and the micrometer scale to the circle reading is a program step of the electronic computer by which the storage for further operations is effected.

According to a further detail of the invention, point numbers, linear values and other measured data may be separately introduced into the optical system for projection to the common image plane. Information such as decimal digits are set in a shifting register by hand whereby suitable code symbols, preferably tetrades corresponding to the decimal digits, are transferred to the same optical plane in which the images of the circles and micrometer scale codes are picked up. The total of all recorded values represents data of a field book and is, since no human influence on the recording is possible, free from errors.

Beside the theodolite constructed in accordance with the present invention being capable of supplying information which is free from error, a remarkable time saving is achieved in the use of such a device by personnel. Such a theodolite is suitable for all known surveying purposes.

Accordingly, it is an object of this invention to provide an improved theodolite construction.

A further object of this invention is to provide a theodolite having a very accurately graduated circle and including means for projecting the graduations and coded information corresponding thereto to a central location for recording thereof.

A further object of the invention is to provide a theodolite having very accurately graduated circle indications and an optical micrometer which are arranged in an optical system to superimpose the information in a position for recording by an instrument such as a camera.

A further object of the invention is to provide a theodolite including a plate circle having graduations thereon indicating degrees and divisions of degrees of arc and coded information adjacent the graduations, said circle being disposed in an optical path along with additional coded information and input information for projection of the images thereof to a central location for photographing.

A further object of the invention is to provide a theodolite having indications of graduations of circle arc, coded information of the arc graduations and additional input information arranged in an optical system having means to superimpose the images at a location for photographing by a camera.

A further object of the invention is to provide a theodolite which is simple in design, rugged in construction, and economical to manufacture.

The various features of novelty which characterize the invention are pointed out with particularly in the claims annexed to and forming a part of this specification. For a better understanding of the invention, its operating advantages and specific objects attained by its use, reference should be had to the accompanying drawings and descriptive matter in which there is illustrated and described a preferred embodiment of the invention.

Figure 2:
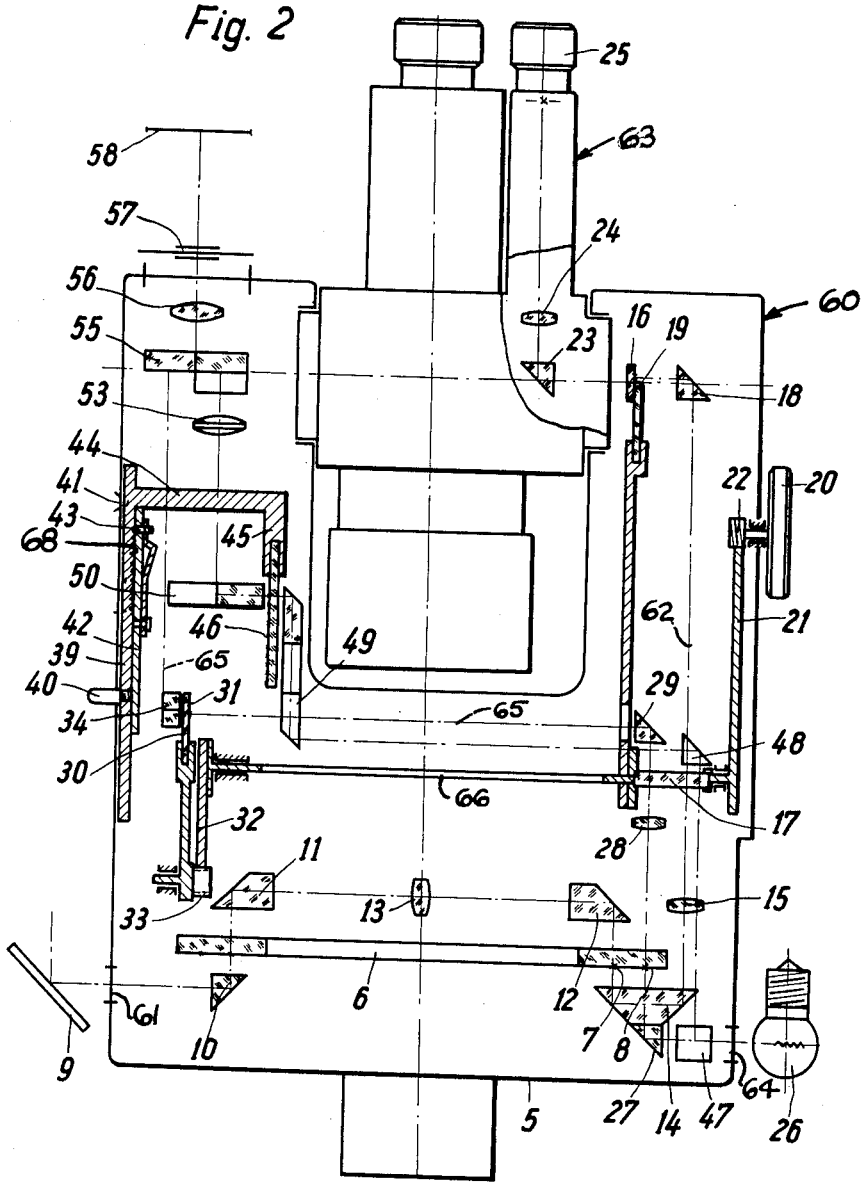
Figure 3:
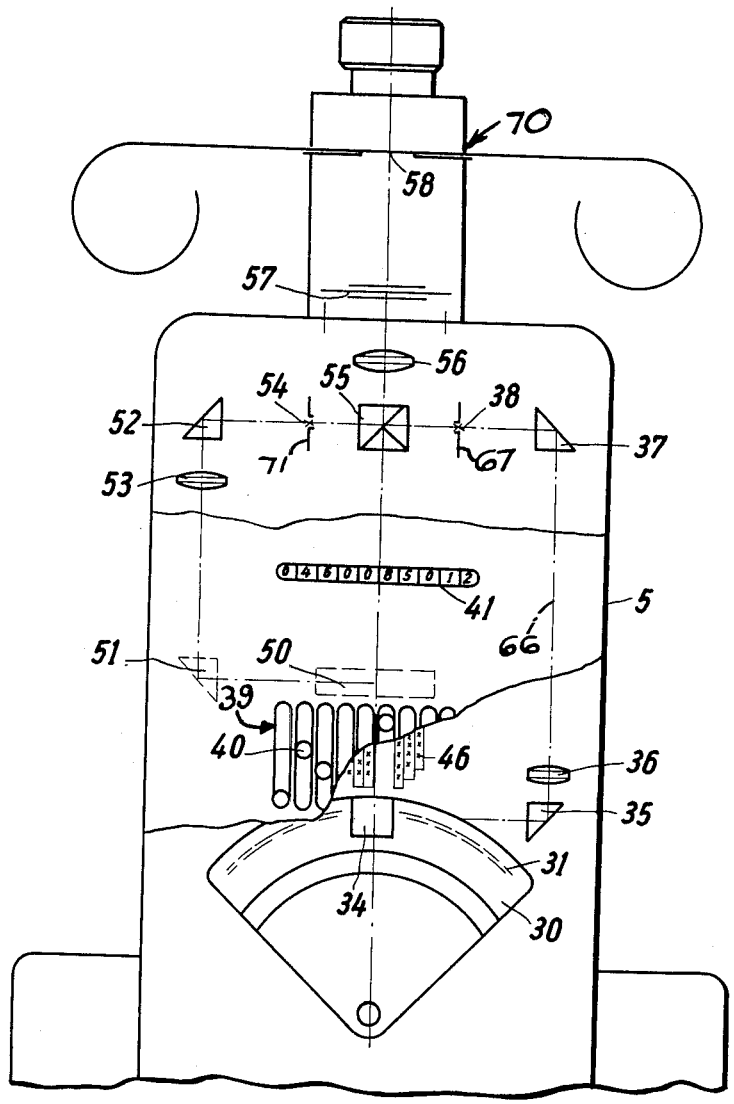

In the drawings:

FIG. 1 is an enlarged fragmentary view of a portion of a circle plate indicating circle graduations and coded information thereon;

FIG. 2 is a somewhat schematic transverse section through a theodolite constructed in accordance with the invention and indicating the optical elements of the theodolite and the photographic means for registering the indications of coded, circle and cipher (input) information; and FIG. 3 is a fragmentary side elevation, partly broken away, indicating the input means for superimposing an image of numerical values in the optical system.

Referring to the drawings in particular, the invention embodied therein includes a theodolite housing generally designated 60 (FIG. 2) having a transparent ring or circular plate 6 with a first annular scale 7 on an annular portion thereof, and a second, or coded notation, annular scale 8 on an annular zone spaced radially outwardly from the zone carrying the scale 7. Referring to FIG. 1, a representative transparent circular plate 1 is illustrated as provided with a first annular scale having circle graduations 2 with numerical indications of degrees, the graduations 2 representing two-tenths of a degree. In FIG. 1 an index 4 is shown indicating a reading of 129.2° which is expressed at the index 4' by the coded indications 3 as comprising the sum of the various zones as indicated $2^1$ to $2^{11}$.

In FIG. 2, the lower portion of the housing 60 is provided with an opening 61 to admit zenital light which is reflected by a mirror 9 supported by suitable means (not shown) outside the housing 60. The zenital light is reflected by the mirror 9 and passes through a prism 10 normal to the transparent circle or ring plate 6 and through the scale 7. The optical system represented by the prisms 11 and 12 and the objective 13, transfers the graduation lines at one side of the scale 7 to the diametrical position at the opposite side of scale 7 where an intermediate image is produced in the plane of the graduation.

The graduations at 7 and the intermediate image originating from the diametrical opposite side of the circle 6 are projected by an objective lens 15 through the prisms 14 and 18 and the parallel plate 17 into the plane of the glass plate 16 which is disposed at the upper end of the housing 60. The plate 16 is provided with an index line thereon. In the drawing, the path of rays from 7 to 16, via the prisms 14 and 18 and the parallel plate 17 and the lens 15 is indicated by the numeral 62.

The parallel plate 17 is mounted at the pivot axis of a sector gear or rack member 21, which may be manipulated through a pinion 22 by means of a knob or handle 20 to tilt the plate 17. When the plate 17 is tilted, the image of the circle graduations is shifted relative to the index on the glass plate 16 until the bisection of the light gaps between the double line is effected. A scale 19 is provided adjacent the glass plate 16 which contains the index mark, and it includes sub-graduations of the circle division intervals and is rigidly connected to the lower end of the rack 21 for movement with the parallel plate 17. The positioning of the transparent scale 19 in relation to the glass plate 16 is such that the indications on the scale may be read adjacent the same index line on the glass plate 16 as are the indications on the circle at 7.

The bisection setting to achieve an accurate reading of the sub-graduations is achieved by operating the knob 20. The circle graduation images and the scale 19 are observed through a microscope generally designated 63 which includes a prism 23, an objective lens 24 and an eye piece 25.

The code as indicated in the annular portion designated 8 and which is centered and oriented in respect to the graduations 7 is illuminated by a light source 26 directed through an opening 64 at the lower end of the housing. The code image is projected by the objective lens 28 mounted above the circle 6, through the parallel plate 17 and the prism 29 onto the transparent glass sector 30 on which coded values 31 are arranged corresponding to the graduation of scale 19. In the drawing, this path of rays is indicated by the numeral 65. The coded values 31 on the glass sector 30 may be arranged according to the same code system as demonstrated by FIG. 1 or according to any other suitable code system. By tilting the parallel plate 17 to bisect the light gaps, the code image on the sector 30 is simultaneously shifted to achieve a well defined code projection for the overall registration.

Since the glass sector 30 is coupled with the parallel plate 17 by means of an extension shaft 66, the sector plate 30 with the code 31 is moved therewith, but by a greater amount, due to the driving arrangement of a sector gear 32, arranged to rotate pinion 33 which carries the sector 30.

As shown in FIG. 3, the code 31 and the image of the code 8 on the circle 6 are projected, as an upwardly directed combined light ray 66, through prisms 34, 35 and 37 and lens 36, adjacent the upper portion of the housing into the image plane designated 38. Suitable masks 67 are provided adjacent the image plane 38 to provide well defined indications of the code symbols. The horizontal line in the middle of prism 34 indicates the common path of rays 65.

In accordance with the invention, numerical values may be incorporated in the optical system, the images of which are directed to the image plane 54. This is accomplished by means of a group of slides generally designated 39 (FIG. 2) each of which carries the figures zero and 1 to 9 thereon. The slides are operated by means of knobs 40 and the numerals positioned on the slides, are indicated in the window 41 (see FIG. 3). For accurate settings stop pins 43 are provided which fall into grooves 68 to index the numerals in position. The grooves 68 are defined on the plate 39 which is slidable inside of a guide plate 42 held in the housing 60.

The input of numerical values on the slide plate 39 is carried out by accurately positioning the individual slides 39 which are rigidly connected to one end of a bridge 44 the other end of which carries a small glass rod 46. The rod 46 contains suitably coated decimal figures which are illuminated by the light source 26 via prisms 47, 48 and 49, the latter prism 49 being an elongated prism disposed in the housing 60 adjacent the slide plate 46. The prisms 47, 48 and 49 are mounted behind the plane of the drawing indicated in FIG. 2.

As indicated in FIGS. 2 and 3, the code or indicia on rods 46 is projected by lens 53 through prisms 50, 51, 52 and into the common image plane 54. A mask 71 is provided to clearly define the indicia.

Recordation of the registration of the indicia is accomplished with the aid of a camera generally designated 70 which is schematically represented by an objective lens 56, a shutter 57 and film 58. The camera is arranged to photograph the code images produced in the masks 38 and 54 and picked up by means of the crossed prisms 55.

In the actual construction of an instrument in accordance with the invention, beside the registration of the indicia for recording by means of a camera, it is possible to visually read and record the information. Furthermore, a suitable registration of the indications of the vertical circle can be realized by applying the same principles as for a horizontal circle as set forth herein.

While specific embodiments of the invention have been shown and described in detail to illustrate the application of the invention principles, it will be understood that the invention may be embodied otherwise without departing from such principles.

What is claimed:

1. A portable theodolite comprising, in combination, a transparent circular plate; a first annular scale on said plate subdivided into graduations corresponding to relatively coarse values of the measured angles; a second annular scale on said plate in the form of first coded indicia corresponding to said graduations, said first and second annular scales being concentric with said circular plate; a second transparent plate having an index thereon; a first optical system defining a light ray path extending normal to said circular plate and through said first annular scale, then parallel to said circular plate substantially diametrically of said first annular scale, and then again normal to said circular plate and through said first annular scale, to provide a pair of closely spaced images of diametrically opposite graduations of said first annular scale; a second optical system, including an adjustable optical element, directing said closely spaced images through said second transparent plate with reference to said index, and to means forming an image plane for observation, at said image plane, of said pair of closely spaced images in relation to said index; an optical micrometer including a transparent scale having thereon second coded indicia representative of relatively fine subdivisions of said relatively coarse values; a third optical system defining a light ray path extending normal to said transparent circular plate through said second annular scale, said adjustable optical element, and said transparent micrometer scale and to said image plane to provide thereat superposed images of said first and second coded indicia; setting means operable to adjust said adjustable optical element to shift said pair of closely spaced images relative to said index to bisect said closely spaced images by said index; means connecting the scale of said optical micrometer to said setting means for conjoint adjustment of said adjustable optical element and said optical micrometer scale; and viewing means including said image plane.

2. A portable theodolite, as claimed in claim 1, including a transparent vernier scale interposed in said second optical system adjacent said second transparent plate for cooperation with said index.

3. A portable theodolite, as claimed in claim 1, in which said connecting means provides for an amplified movement of said optical micrometer scale relative to the movement of said adjustable optical element.

4. A portable theodolite, as claimed in claim 1, including a camera disposed to focus at said imagine plane.

5. A portable theodolite, as claimed in claim 1, including a fourth optical system having a first section and a second section, said second section being coincident with that portion of said third optical system directed to said image plane; and transparent numerical indicia means interposed in said first section of said fourth optical system for direction of images thereof to said image plane.

References Cited by the Examiner

UNITED STATES PATENTS

| | | | |
|---|---|---|---|
| 1,720,964 | 7/29 | Metcalf | 33—222 |
| 2,111,516 | 3/38 | Roux | 33—1 |
| 2,544,851 | 3/51 | McCarthy et al. | 33—1 X |
| 2,616,177 | 11/52 | Bazhaw | 33—1 |
| 2,619,002 | 11/52 | Baker | 33—72 X |
| 2,747,797 | 5/56 | Beaumont | 340—347.3 X |
| 2,757,567 | 8/56 | Hillman et al. | 88—1 |
| 2,893,123 | 7/59 | Bach et al. | 33—46 |
| 2,899,673 | 8/59 | Reiner | 340—347.3 X |
| 2,911,877 | 11/59 | Drodofsky. | |

FOREIGN PATENTS 528,128  10/40  Great Britain.

ISAAC LISANN, *Primary Examiner.*

LOUIS R. PRINCE, *Examiner.*